Oct. 11, 1932.  B. F. GRAVELY  1,881,505

TRACTOR

Original Filed Aug. 13, 1930    4 Sheets-Sheet 1

B. F. Gravely, Inventor

By Horace C. Chandler

Attorney

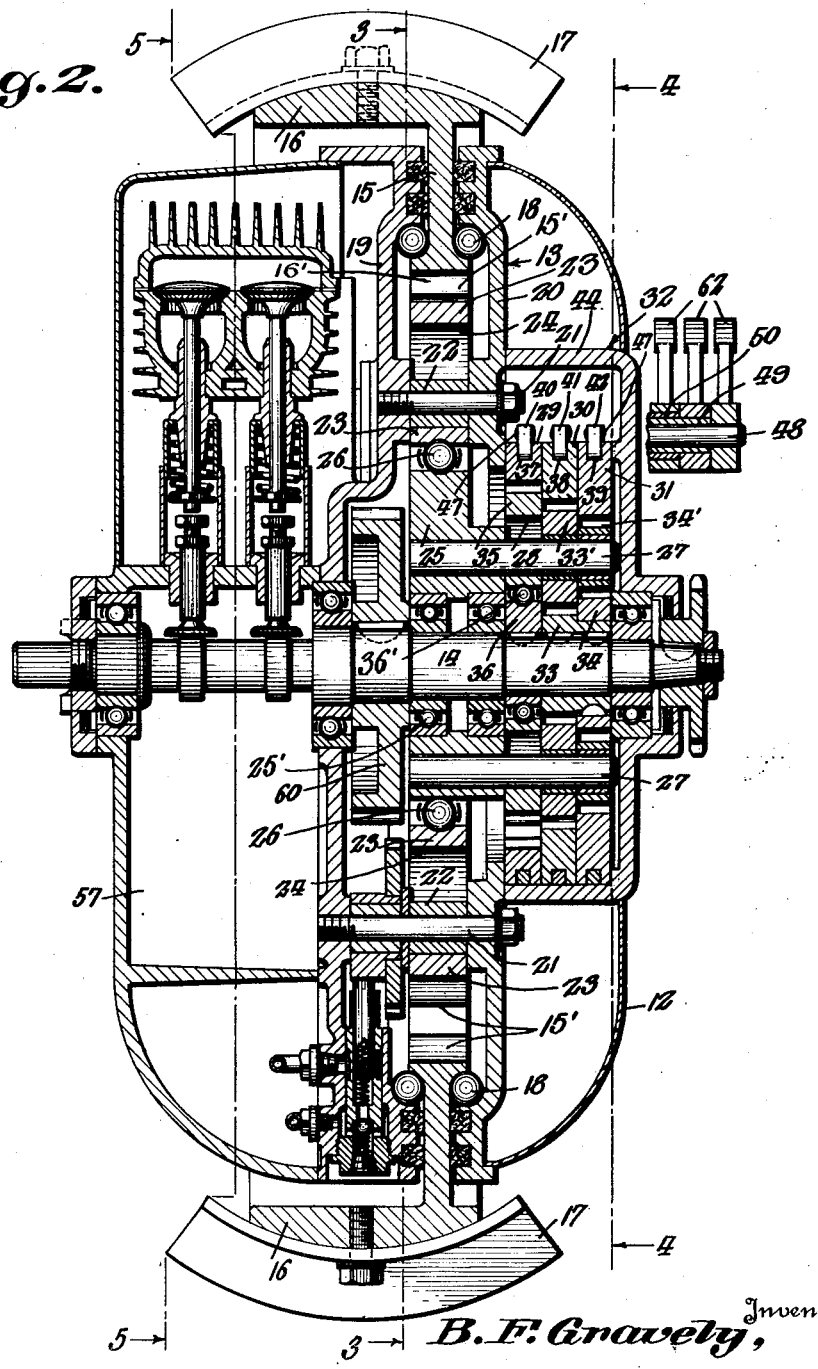

Oct. 11, 1932.  B. F. GRAVELY  1,881,505
TRACTOR
Original Filed Aug. 13, 1930    4 Sheets-Sheet 3

B. F. Gravely, Inventor

By Horace Chandler
Attorney

Oct. 11, 1932. B. F. GRAVELY 1,881,505
TRACTOR
Original Filed Aug. 13, 1930 4 Sheets-Sheet 4

B. F. Gravely, Inventor

By Horace C. Chandlee
Attorney

Patented Oct. 11, 1932

1,881,505

UNITED STATES PATENT OFFICE

BENJAMIN F. GRAVELY, OF DUNBAR, WEST VIRGINIA

TRACTOR

Application filed August 13, 1930, Serial No. 475,114. Renewed May 7, 1932.

This invention relates to new and useful improvements in tractors, and particularly to tractors adapted for use in connection with agricultural machines, road making machines, and the like.

One object of the invention is to provide a device of this character wherein the entire driving motor and gearing are contained within a wheel which is adapted to be readily attached to any machine of the characters above named.

Another object is to provide a novel and improved gearing for driving the unit.

Other objects and advantages will be apparent from the following description when taken in connection with the accompanying drawings.

In the drawings:

Figure 2 is an enlarged vertical sectional view centrally through the unit, on the line 2—2 of Figure 1.

Referring particularly to the accompanying drawings, 10 represents a portion of the frame of an agricultural machine, which is equipped with the propelling unit, represented as a whole by the numeral 12.

Figure 1:
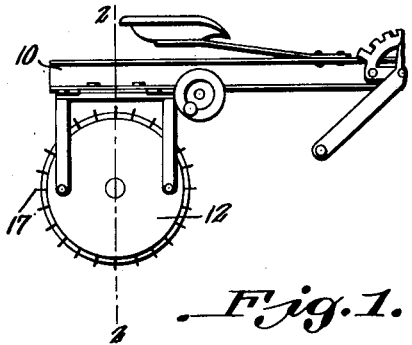
Figure 1 is a side elevation of a portion of a cultivator showing the application of the unit.
Figure 4:
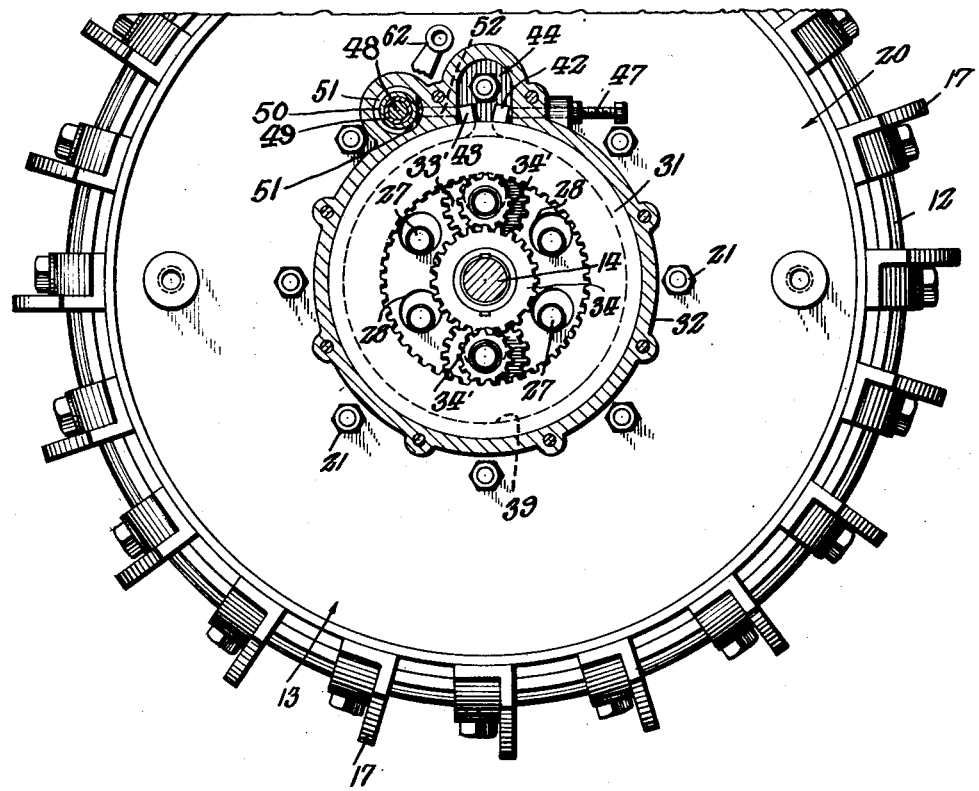
Figure 4 is a vertical sectional view on the line 4—4 of Figure 2.
Figure 3:
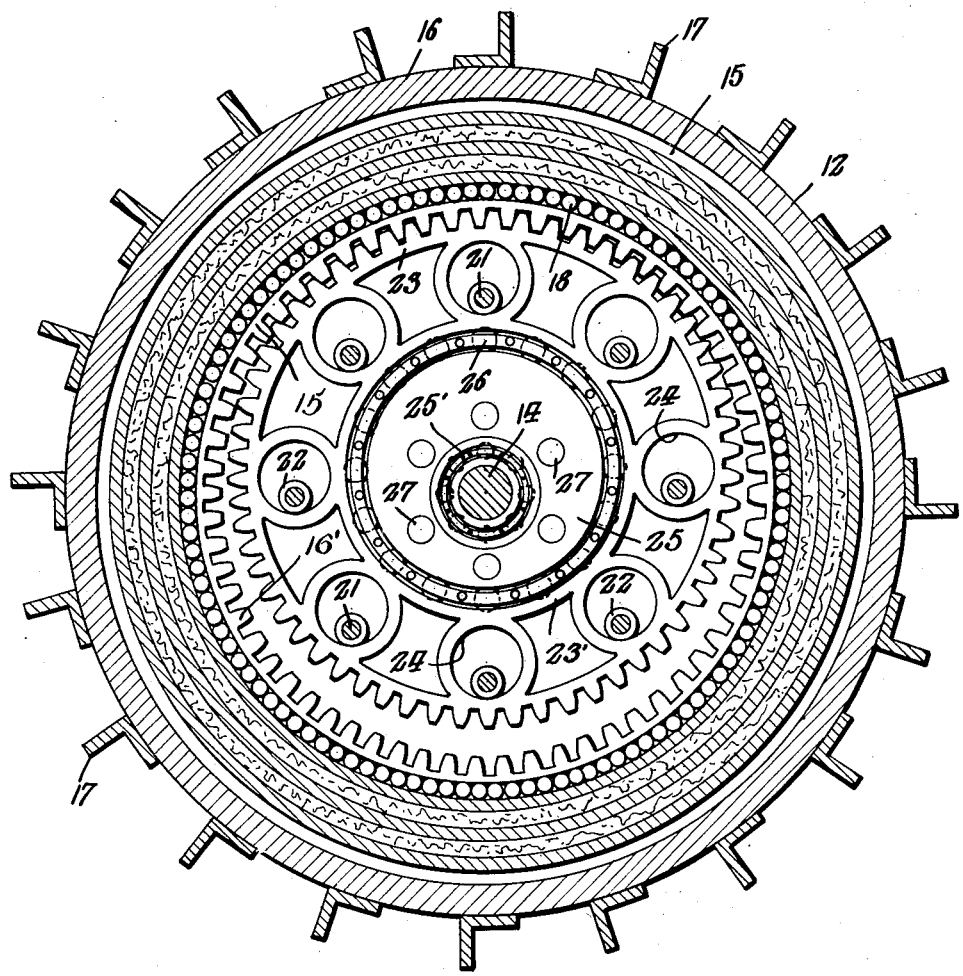
Figure 3 is a vertical sectional view on the line 3—3 of Figure 2.
Figure 5:
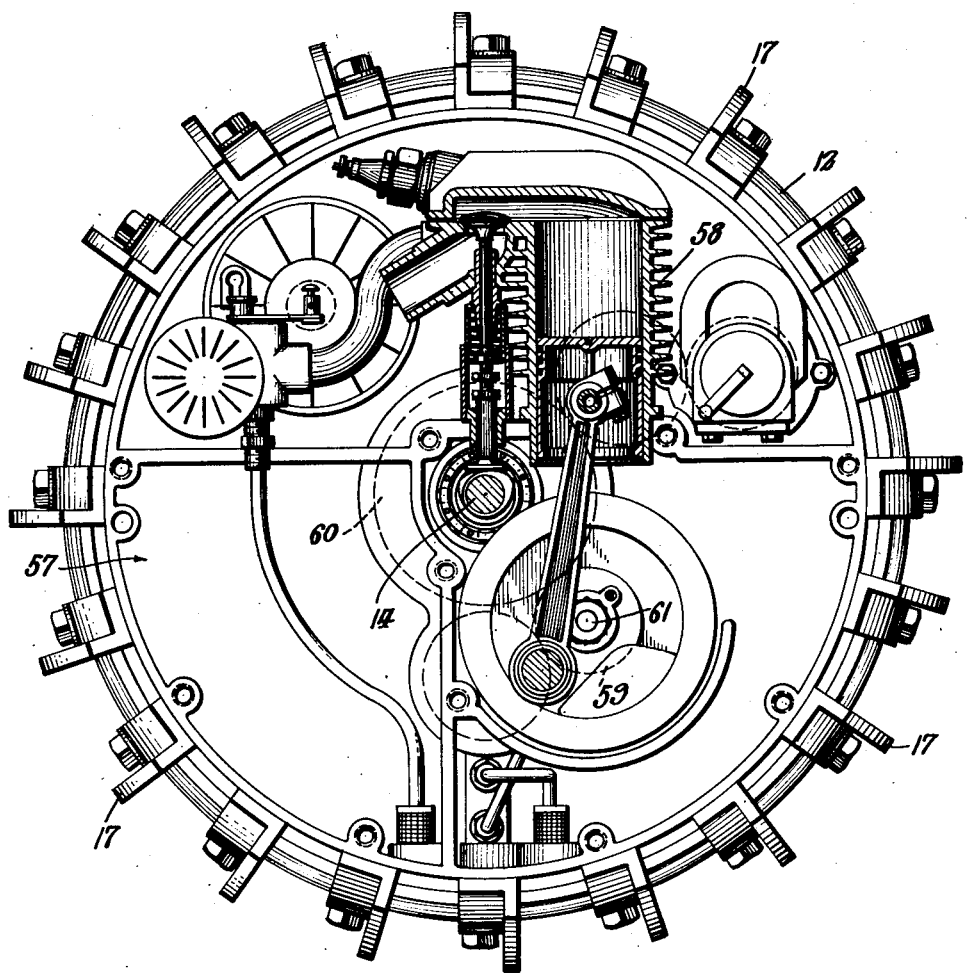
Figure 5 is a vertical sectional view on the line 5—5 of Figure 2.

The unit includes a casing, generally indicated by the numeral 13, and through the center of which is disposed the main drive shaft 14. A wheel rim 16 is arranged concentrically outward of the casing 13, and has a web 15 which extends into and is rotatable within said casing. The outer face of the rim is provided with ground engaging lugs 17. Between the casing 13, and the web 15, are the bearing balls 18. A large opening 15' is formed in the center of the web 15, and in the wall of said opening are the inwardly projecting gear teeth 16'. The casing 13 comprises the plates or disks 19 and 20, secured together by means of the bolts 21, each of which has a rotatable bearing sleeve 22 thereon. Mounted in the casing 13, within the gear ring formed by the web 15, (see Figure 3), is a peripherally toothed ring or disk 23, having the hub portion 23', said hub being mounted on the eccentric 25, which rotates on a bearing 25', carried by the shaft 14. It will be noted that a portion of the teeth of the disk 23 are in mesh with the teeth 15' of the web 15, whereby to give driving rotation to the wheel rim 16, and thereby the propulsion of the unit. The disk 23 is provided with a circular series of circular openings 24, each of which receives one of the bolts 21 with its rotatable bearing sleeve 22, whereby to permit the eccentric rotation of said disk. Between the eccentric 25 and the hub 23' of the disk 23, are the bearing balls 26, as clearly shown.

Carried by the eccentric or cam 25, for rotating the same, and projecting through one side of the casing 13, are the stub shafts 27. These shafts, which are arranged in circular series concentric with the shaft 14, extend through circular openings 28, in internal gear rings 29, 30, and 31, which are supported in a housing 32, removably secured on the side of said casing 13. Secured to the shaft 14, within this housing 32, is a gear 33 having a projecting hub on which is keyed a gear 34, the former gear being of less diameter than the latter, for a purpose which will appear later herein. On two diametrically opposite shafts 27 are rotatably supported the planetary gears 33' and 34', meshing respectively with the teeth of the gear rings 30 and 31, and with the gears 33 and 34, respectively. Within the gear ring 29 is an externally toothed disk 35, which is supported on the cam 36, by means of the bearings 36', said cam being keyed on the shaft 14, as shown. The peripheries of the disks or rings 29, 30, and 31, have grooves 37, 38, and 39, respectively, which are disposed spring bands 40, 41, and 42, respectively, said bands having their ends turned outwardly, as at 43, within the cavity 44, in the upper portion of the wall of the housing 32. Disposed through a side wall of the cavity 44 are screws 47, the ends of which bear, respectively, against corresponding outturned ends of said spring bands. Adjacent the cavity 44, is mounted a shaft 48, which carries the rotatable telescoped sleeves 49 and 50. The shaft 48, and each of the sleeves carries on its inner end, a cam 51, which bears on the outer end of a pin 52, slidable through the adjacent wall of the cavity 44, and having its inner end engaged with the other outturned end of one of the spring bands. Each of the sleeves 49 and 50, and the shaft 48, is provided with a radial lever 62, by means of which the shaft or sleeve may be rocked, whereby to engage or disengage the bands, with respect to the said disks, so that said disks may be held against rotation, or permitted to rotate, in accordance with the desire of the operator, for the purpose of controlling the speed of the mechanism.

Formed on the side of the casing 13, opposite to that on which the housing 32 is mounted, is a chamber 57, in which is mounted a reciprocating engine 58, connected in proper driving relation to the shaft 14, by means of the gears 59 and 60, carried respectively by the shaft 61, and the shaft 14.

In the operation of the device, the operator grasps and moves one of the levers 62, which causes the tightening of one of the bands, as for instance the band 42, so that the disk 31 is held against rotation, thereby causing the gear 34, on the shaft 14, to rotate the gears 34', of the shafts 27, which in turn drive the cam 25, due to the fact that as the gears 34' roll around the inner toothed face of the gear 31, said cam will move the shafts 27 in an orbit, around the shaft 14. The turning of the cam 25 acts upon the disk 23, whereby to cause the latter to swing around and engage its peripheral teeth with the internal teeth 15', of the member 15, with the result that said member will be rotated within the casing 13, and the ground engaging lugs provide the traction to propel the machine.

Movement of another of the levers 62, as for instance the one which rocks the sleeve 49, causes the disk 30 to remain stationary, and through the medium of the gear 33, the gears 33' roll in meshing engagement with the disk 30, whereby to turn the cam 25. In view of the fact that the gears 33 and 33' are of different diameters from the gears 34 and 34', the member 15 will be driven at a different speed, from that above described, in connection with the gear 34. When, however, the remaining lever 62 is rocked, the spring band 40 will hold the disk 29 stationary, so that the cam 36 will drive the disk or ring 35, around within the ring 29, so that the teeth of the former will engage with the teeth of the latter, and thereby drive the cam 25 in a direction opposite to that when driven by the gears 33' and 34', with the result that the engagement of the teeth of the member 23 will turn the member 15 in a reverse direction, to accomplish the reverse, or backward movement of the machine.

While I have shown the propelling unit as applied to an agricultural machine, I wish it understood that the same may be applied to any other machine desired. Furthermore, this particular type of gearing illustrated, is adaptable for use in connection with other machines of various types, such as woodworking and metalworking machines, as will be readily understood.

What is claimed is:

1. A driving unit comprising a casing, a rotatable element in the casing having its periphery projecting from the casing into ground engaging position, a motor in the casing, said rotatable element having a web portion within the casing provided with a toothed opening, and operative connections between the motor and said toothed web portion.

2. A driving unit comprising a casing, a rotatable element in the casing having its periphery projecting from the casing into ground engaging position, a motor in the casing, said rotatable element having a web portion in said casing provided with a toothed opening, and an eccentrically actuated gear driven by said motor engaged with the teeth of said web portion.

3. A driving unit comprising a casing, a rotatable element in the casing having its periphery projecting from the casing into ground engaging position, a motor in the casing, said rotatable element having a web portion in said casing provided with a toothed opening, an eccentrically actuated gear engaged with the teeth of said web portion, and a change speed driving means between said motor and said gear.

In testimony whereof, I affix my signature.

BENJAMIN F. GRAVELY.